United States Patent [19]
Prior

[11] Patent Number: 5,253,724
[45] Date of Patent: Oct. 19, 1993

[54] POWER WHEELCHAIR WITH TRANSMISSION USING MULTIPLE MOTORS PER DRIVE WHEEL

[76] Inventor: Ronald E. Prior, 4915 Industrial Way, Coeur d'Alene, Id. 83814

[21] Appl. No.: 783,614

[22] Filed: Oct. 25, 1991

[51] Int. Cl.$^5$ ............................................. B60K 1/02
[52] U.S. Cl. .................... 180/65; 180/65.6; 180/65.8; 180/69.6; 180/907; 74/661; 474/85
[58] Field of Search ............. 180/6.5, 6.51, 6.48, 180/6.2, 65.6, 65.8, 69.6, 907; 74/661, 665 B; 474/85, 75, 137, 138, 134, 135

[56] References Cited

U.S. PATENT DOCUMENTS

| | | | |
|---|---|---|---|
| 2,993,550 | 7/1961 | Klappert | 180/15 |
| 3,142,202 | 7/1964 | Muhlbeyer | 74/665 B |
| 3,566,714 | 3/1971 | Borello | 74/661 |
| 3,570,620 | 3/1971 | Fisher | 180/65.6 |
| 4,270,622 | 6/1981 | Travis | 180/65.6 |
| 4,298,082 | 11/1981 | Ramos | 180/65.8 |
| 4,415,049 | 11/1983 | Wereb | 180/907 |
| 4,452,327 | 6/1984 | Mowat et al. | 180/11 |
| 4,481,841 | 11/1984 | Abthoff et al. | 180/69.6 |
| 4,674,584 | 6/1987 | Watkins | 180/8.2 |

FOREIGN PATENT DOCUMENTS

| | | | |
|---|---|---|---|
| 0333377 | 2/1921 | Fed. Rep. of Germany | 180/65.6 |
| 0880824 | 4/1943 | France | 180/65.6 |
| 0162329 | 12/1979 | Japan | 180/65.6 |
| 0214554 | 9/1988 | Japan | 74/661 |

*Primary Examiner*—Mitchell J. Hill
*Assistant Examiner*—Anne Marie Boehler
*Attorney, Agent, or Firm*—Wells, St. John, Roberts, Gregory & Matkin

[57] ABSTRACT

A powered wheelchair 50 comprises a frame 52 and two independently rotatable drive wheels 54 and 56 mounted to the frame 12. Two motors 62 and 64 are coupled via coupler 70 to the drive wheel 54 such that the motors 62 and 64 drive the drive wheel 54 in different speed ranges. Two motors 66 and 68 are coupled via coupler 80 to drive the drive wheel 56 such that the motors 66 and 68 drive the drive wheel 56 in different speed ranges. Various control systems, including a microprocessor based control system 190, may be employed to control the motors 62, 64, 66, and 68.

11 Claims, 9 Drawing Sheets

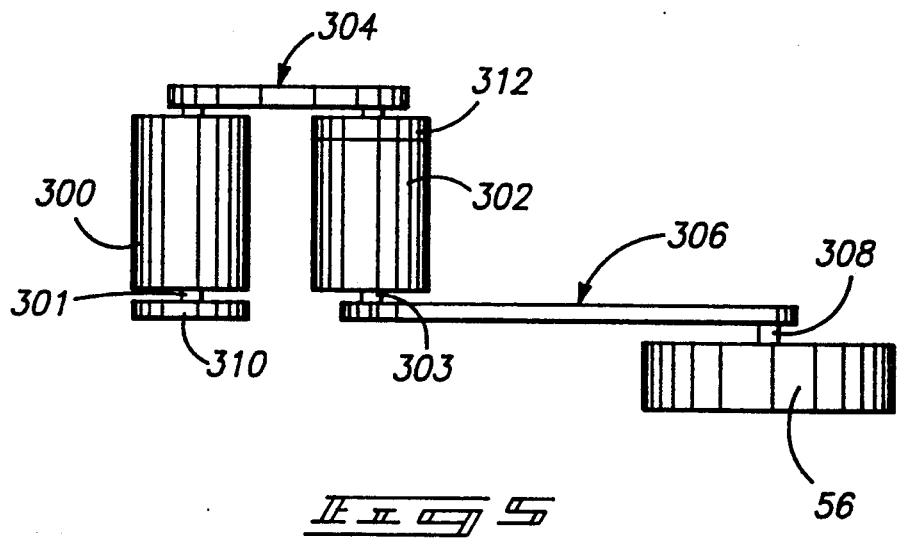
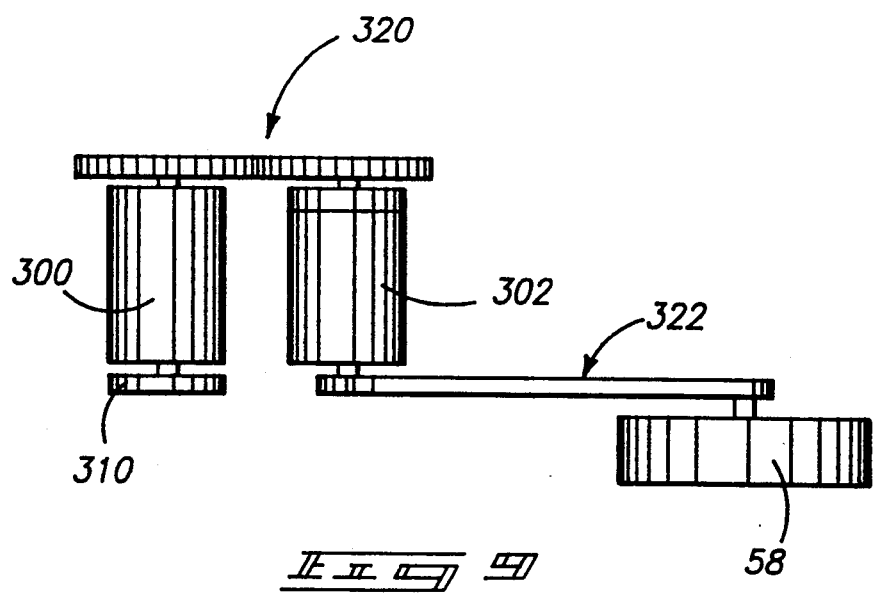

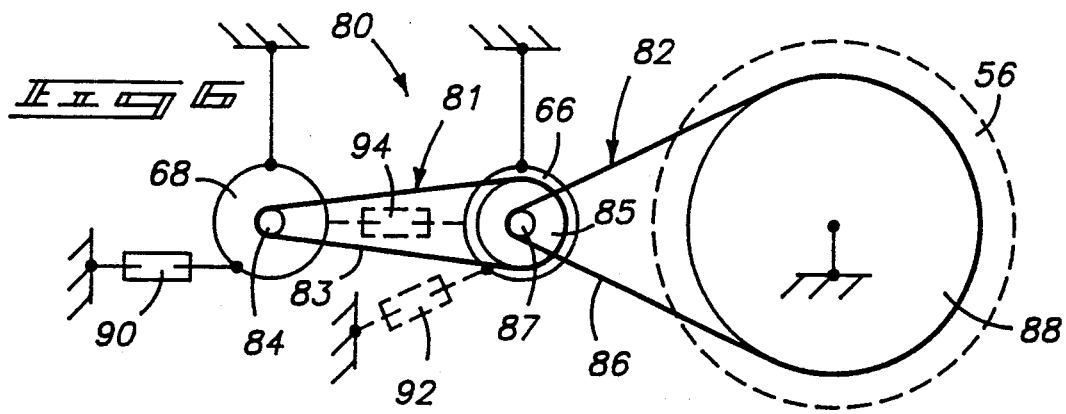
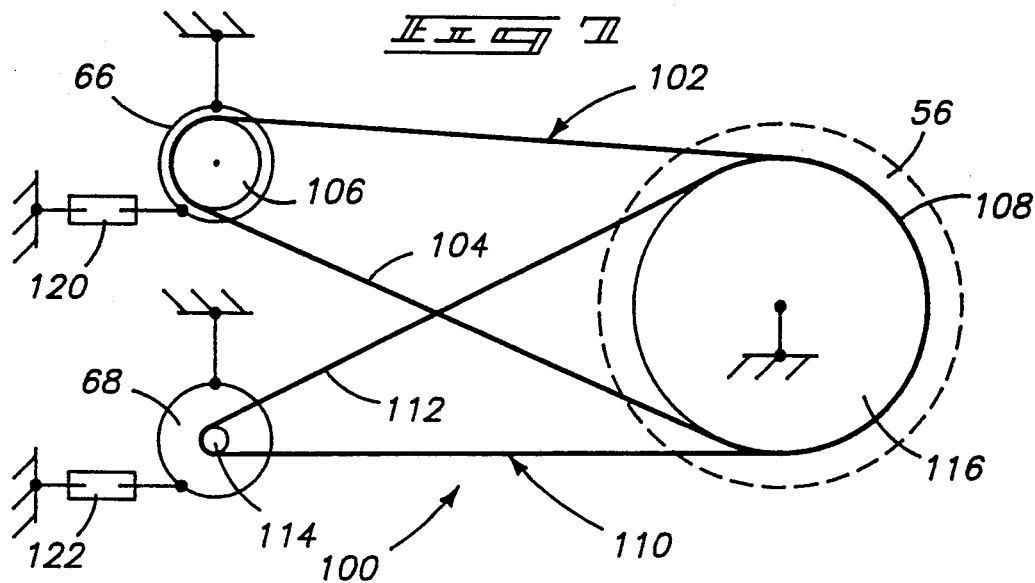
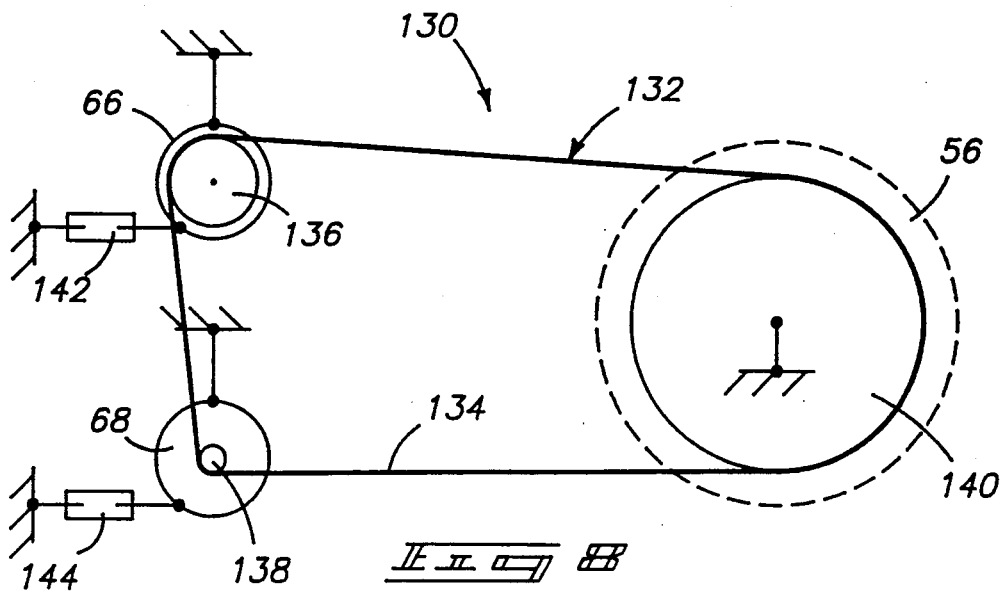

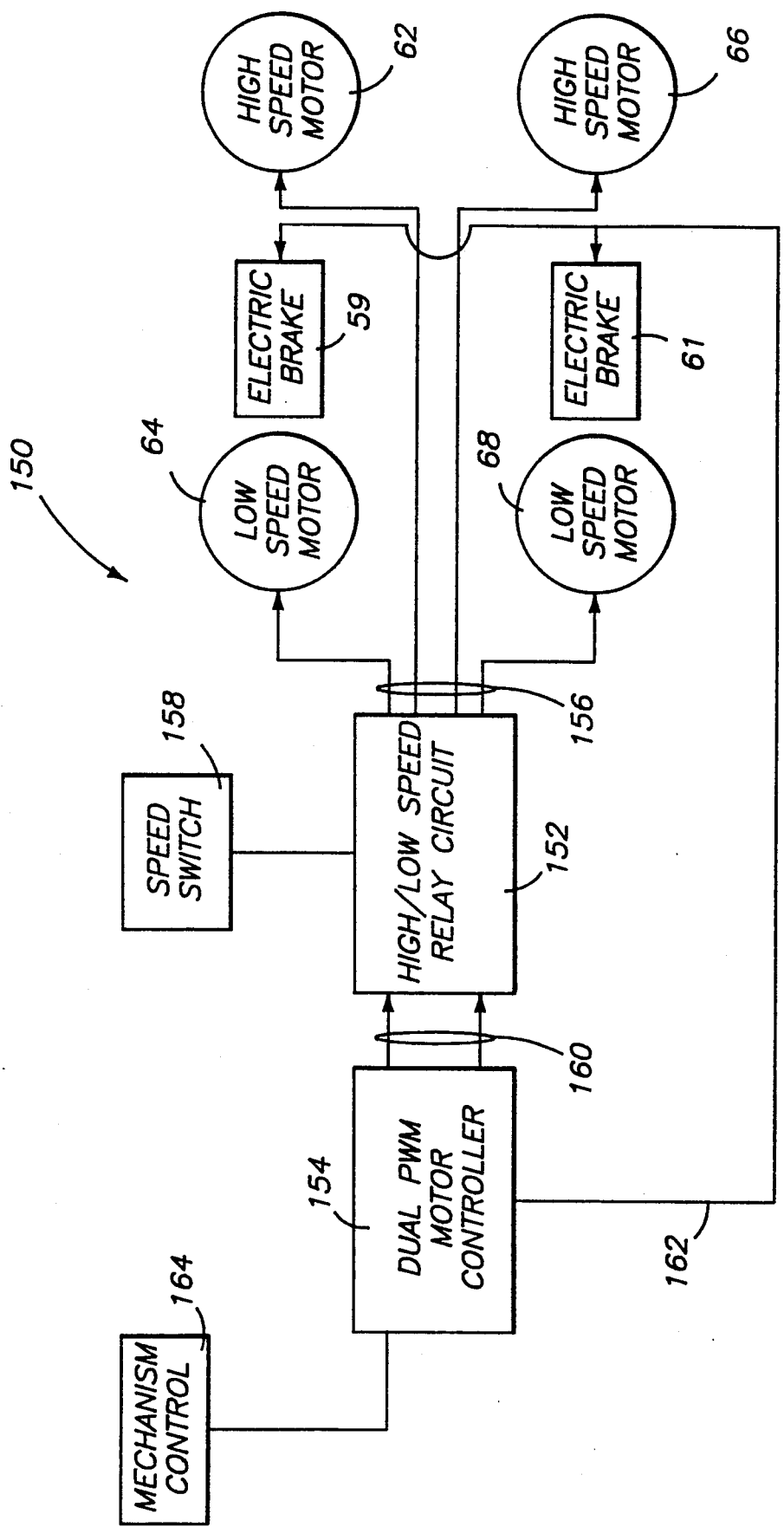

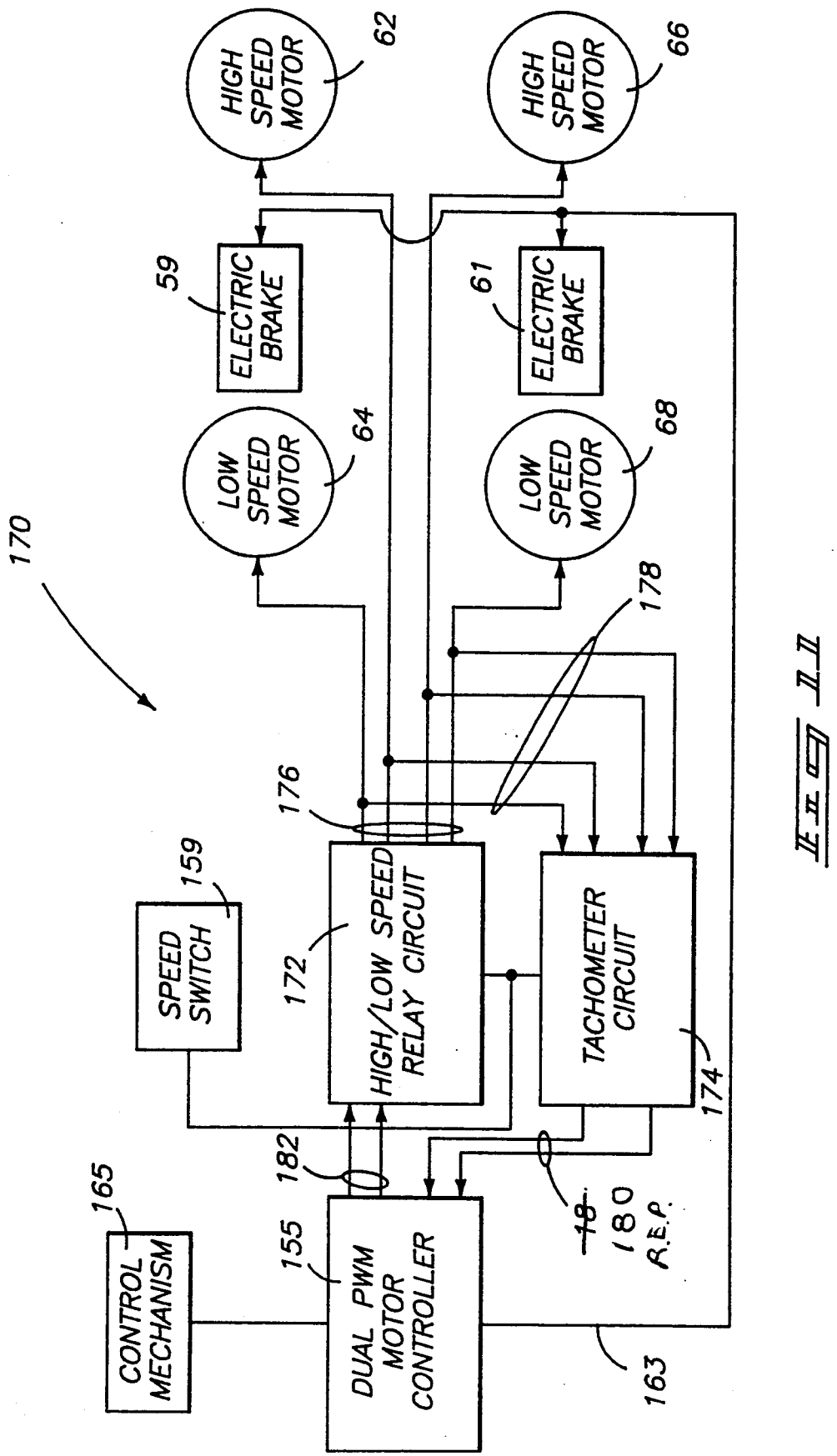

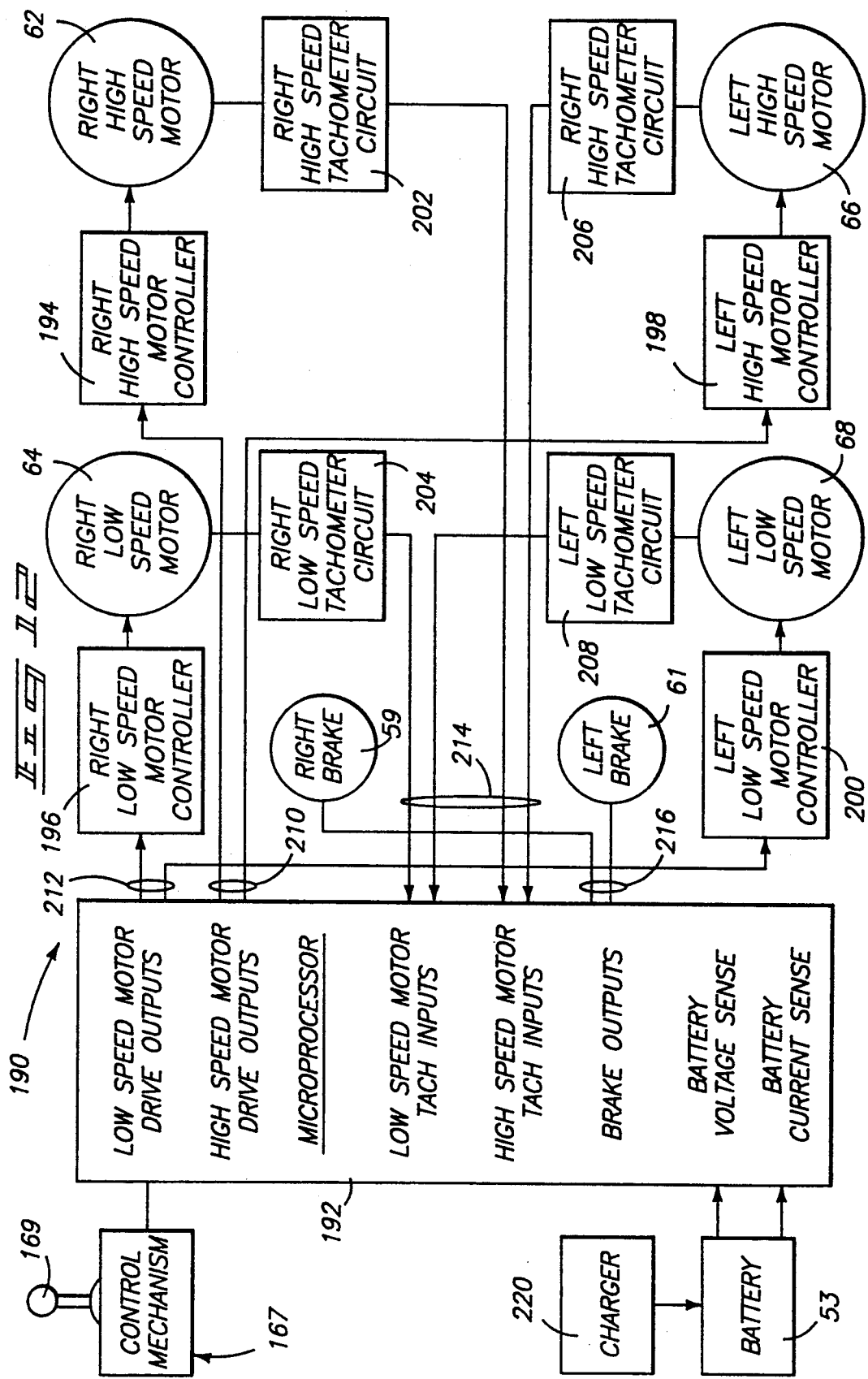

POWER WHEELCHAIR WITH TRANSMISSION USING MULTIPLE MOTORS PER DRIVE WHEEL

TECHNICAL FIELD

The present invention relates to powered vehicles, and more particularly, to a powered wheelchair.

BACKGROUND OF THE INVENTION

Most power wheelchairs utilize two electric drive motors (one on each side) which are coupled to the drive wheels by drives such as pulleys and belts, gears, sprockets and chains, and cog on tire. The powered wheelchairs are differentially steered (similar to a tank). Both drive wheels are driven forward when going forward, whereas the inside wheel is slowed, stopped, or even reversed when turning. Both drive wheels are driven in reverse when going backwards.

FIGS. 1 and 2 show a prior art powered wheelchair 10 having a frame 12, two drive wheels 14 and 16 rotatably connected to the rear of the frame 12, and two non-drive wheels 18 and 20 rotatably connected to the front of the frame 12. The powered wheelchair 10 also includes a power transmission which comprises two motors 22 and 24 and respective drives 26 and 28. The drive 26 couples the motor 22 to the drive wheel 14, and the drive 28 couples the motor 24 to the drive wheel 16. A battery 30 supplies power to the motors 22 and 24.

The powered wheelchair 10 further includes a control system which controls the speed and direction of the motors 22 and 24. Electric brakes 34 and 36 are attached to the shafts of respective motors 22 and 24 to provide braking force thereto.

The motors 22 and 24 drive the powered wheelchair 10 in one speed range. Typically, the maximum wheelchair velocity is in the speed range of less than six miles per hour. The powered wheelchair 10 is therefore limited in speed. Although the lower speed range is beneficial for certain wheelchair functions, such as hill climbing, or powering over obstacles, the low speed range is not always preferable on flat terrain. Wheelchair operators often demand that their wheelchairs perform at higher speeds on flat terrain. Some operators desire speeds in the eight to ten miles per hour range, or higher. These wheelchair operators do not, however, want to sacrifice the low speed ranges (which are necessary for hill climbing) to achieve the higher speeds. The powered wheelchair shown in FIGS. 1 and 2 is incapable of achieving the desired mixture of low speeds for hill climbing and high speeds for flat terrain.

One approach to overcome this problem is to employ a two-speed gearbox with each motor 22 and 24. A two-speed gearbox would enable the wheelchair operate at low speeds when climbing hills or moving over obstacles, and to operate at high speeds when on a flat surface. This approach, however, has limitations in that the transmission system is mechanically complex.

Therefore, the present invention provides a different, and mechanically more simple, approach to solving the above-mentioned problem. The present invention provides a powered wheelchair which employs multiple motors for each drive wheel. Each motor drives the drive wheel in a different speed range, thereby permitting the wheelchair to achieve higher speed ranges without compromising the necessary low speed range for hill climbing and indoor travel.

BRIEF DESCRIPTION OF THE DRAWINGS

Preferred embodiments of the invention are described below with reference to the accompanying drawings, wherein like numerals reference like elements, in which:

FIG. 5 is a diagram illustrating an alternative embodiment of a two motor per drive wheel system according to the present invention;

FIG. 6 is a side view of the power transmission employed in the powered wheelchair of FIGS. 3 and 4;

FIG. 7 is a side view of another embodiment of a power transmission for use in a powered wheel chair according to the present invention;

FIG. 8 is a side view of another embodiment of a power transmission for use in a powered wheelchair according to the present invention;

FIG. 9 is a diagram illustrating another embodiment of a two motor per drive wheel system according to the present invention;

FIG. 10 is a schematic of an open loop transmission control circuit which may be used to control the powered wheelchair of FIG. 3;

FIG. 11 is a schematic of a closed loop power transmission control circuit which may be used to control the powered wheelchair of FIG. 3;

FIG. 12 is a schematic of a microprocessor based power transmission control system which may be used to control the powered wheelchair of FIG. 3.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 4:
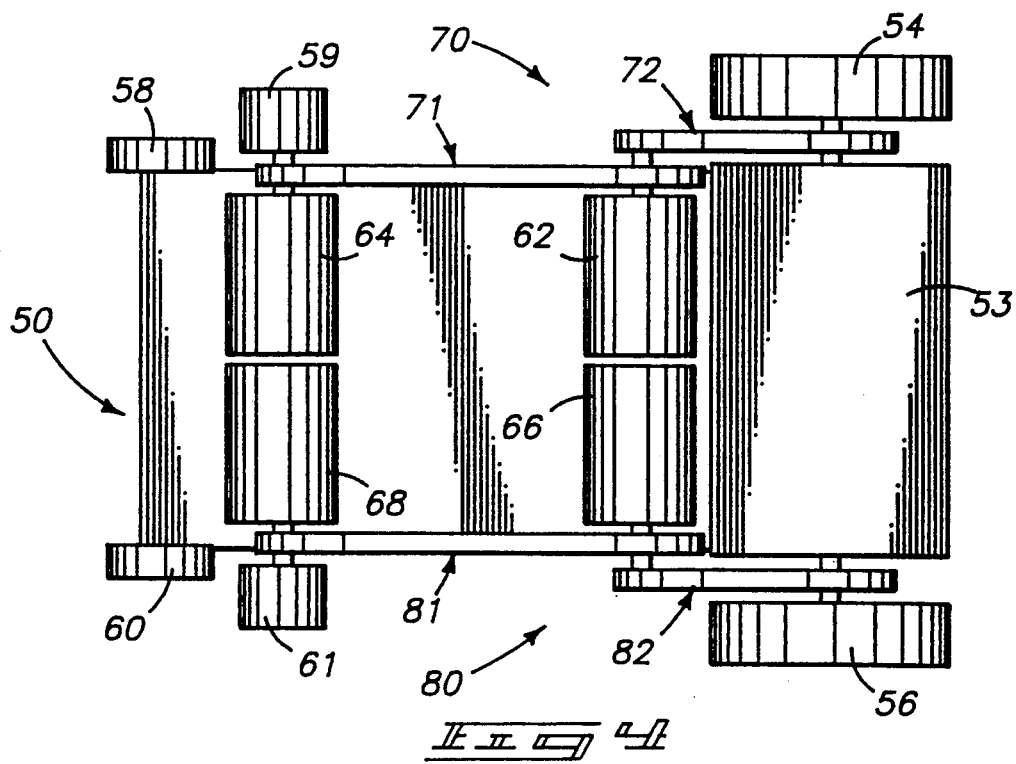
FIG. 4 is a diagram illustrating the power transmission of the powered wheelchair shown in FIG. 3.
Figure 3:
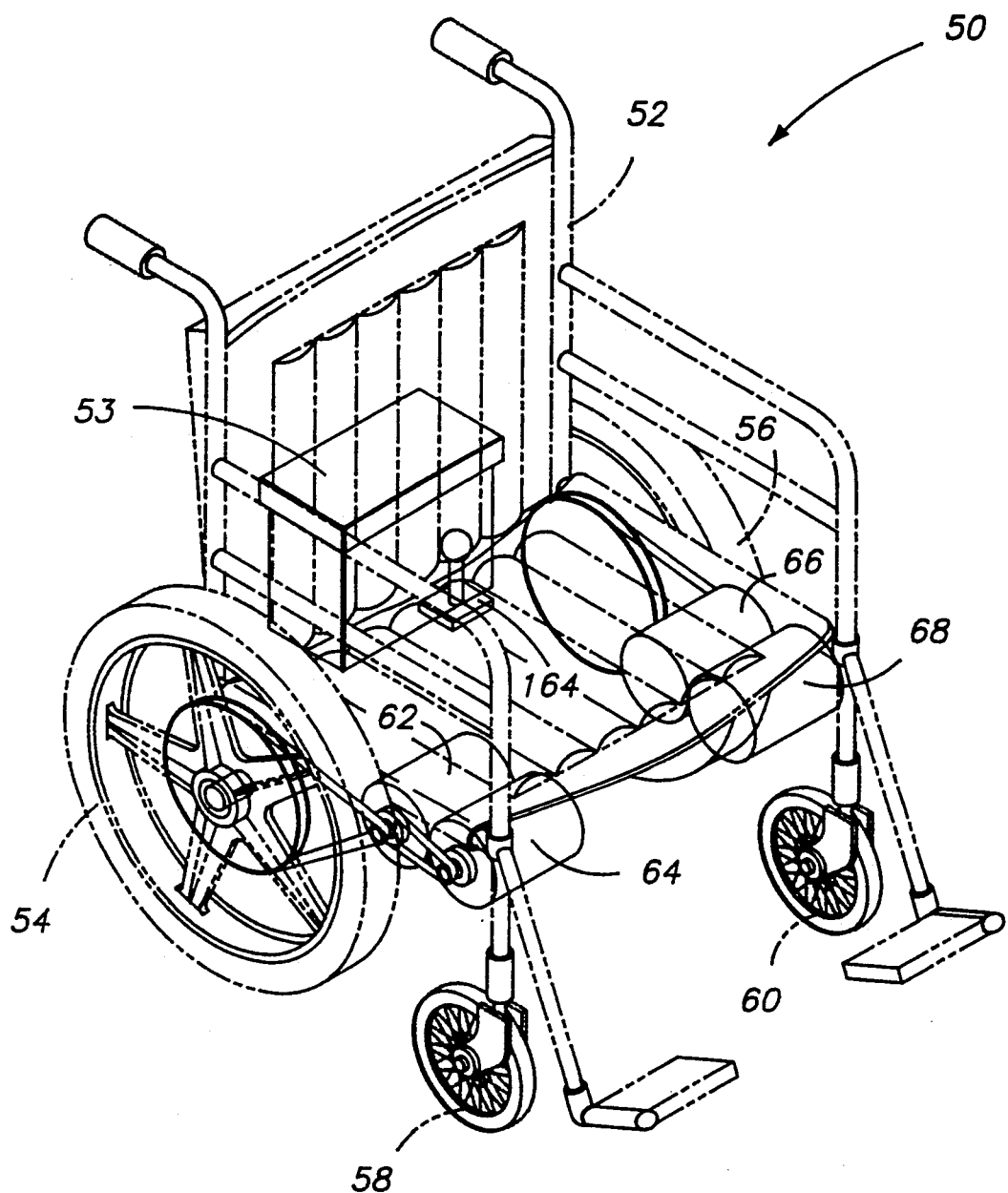
FIG. 3 is a perspective view of a powered wheelchair according to one embodiment of the present invention.

FIGS. 3 and 4 show a powered wheelchair 50 according to the present invention. The powered wheelchair 50 includes a frame 52, two independently rotatable drive wheels 54 and 56 mounted to the frame 52, and two non-drive wheels rotatably connected to the front of the frame 52. The powered wheelchair 50 also includes a power transmission having motors 62, 64, 66, and 68. The motors 62 and 64 are connected via coupler 70 to the drive wheel 54. The coupler 70 includes a first drive 71 coupled between the motors 62 and 64 and a second drive 72 coupled between the motor 62 and the drive wheel 54. Similarly, the motors 66 and 68 are coupled via a coupler 80 to drive the drive wheel 56. The coupler 80 includes a first drive 81 coupled between the motors 66 and 68 and a second drive coupled between the motor 66 and the drive wheel 56.

The motors 62, 64, 66, and 68 are preferably electric motors, although gas powered motors may be adapted for use in the present invention. A battery 53 supplies power to the motors 62, 64, 66, and 68.

The motors 62 and 64 are coupled via the coupler 70 to the drive wheel 54 such that the motor 62 drives the drive wheel 54 in a high speed range and motor 64 drives the drive wheel 54 in a low speed range. Likewise, the motors 66 and 68 are coupled via the coupler 80 to the drive wheel 56 such that the motor 66 drives the drive wheel 56 in a high speed range and the motor 68 drives the drive wheel 56 in a low speed range. To achieve the different speed ranges, the motors 62, 62, 66, and 68 may be designed to operate in the same speed range, and the different speed ranges are achieved solely through the couplers 70 and 80. Alternatively, the motors 62 and 66 may be designed to operate at higher speeds than motors 64 and 68.

The motors 62, 64, 66, and 68 may be "free wheeling" motors to minimize system drag or friction when the motors are not being driven. For example, when the powered wheelchair 50 is being driven in the high speed range by motors 62 and 66, the shafts of the motors 64 and 68 may be rotated with very little effort to thereby minimize the amount of energy expended by the high speed motors 62 and 66 as a result of being coupled to the low speed motors 64 and 68.

Alternatively, the motors 62 and 66 may be adapted with a clutch (not shown here, but shown diagrammatically below with reference to FIG. 5) which disengages the drives 71 and 81 (and thus, to disengage low speed motors 64 and 68) when the powered wheelchair is being driven in the high speed range. An advantage of using a clutch is that the two drive per wheel system of the present invention, when operating in the high speed range, becomes almost as efficient as a single drive per wheel system. When the low speed motors 64 and 68 are driving the powered wheelchair in the low speed range, the applied torque is at high levels and thus the drag or friction resulting from the shafts of the inoperable high speed motors 62 and 66 is negligible.

The powered wheelchair 50 further includes two electric brakes 59 and 61 operatively coupled to provide braking pressure on the shafts of the motors 64 and 68, respectively. The electric brakes 59 and 61 are preferably mechanically biased to a brake position in the absence of power to the brakes. To disengage the brakes, power must be applied to the electric brakes. In this manner the brakes 59 and 61 automatically engage to brake the powered wheelchair 50 when the wheelchair operator ceases to drive the powered wheelchair 50, or if power is lost.

Although the brakes 59 and 61 are shown coupled to the motors 64 and 68, brakes may alternatively be coupled to the shafts of the motors 62 and 66 or to the shafts of drive wheels 54 and 56. However, brakes mounted to the shafts of the drive wheels 54 and 56 are typically larger and more expensive.

Figure 1:
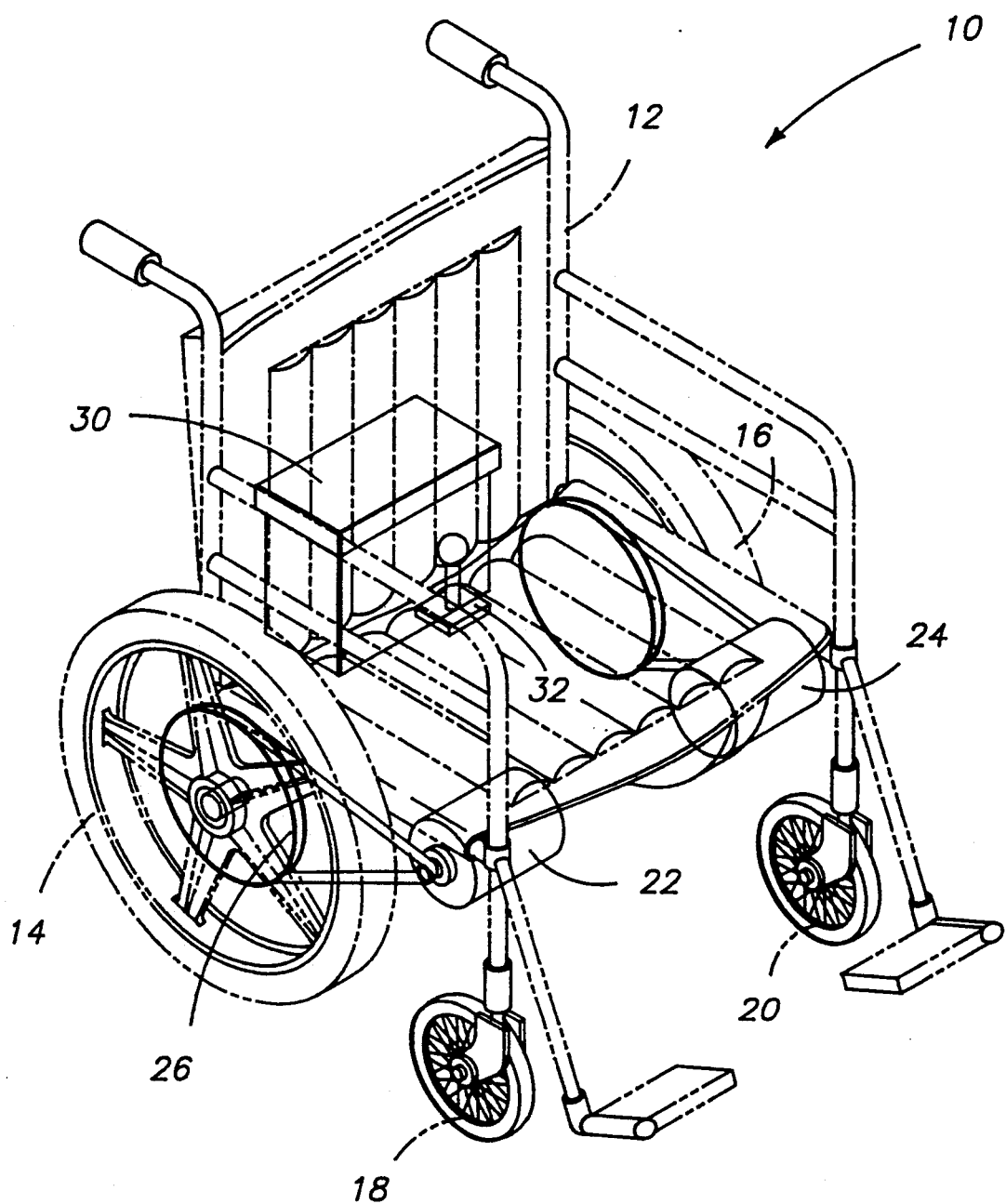
FIG. 1 is a perspective view of a prior art powered wheelchair.
Figure 2:
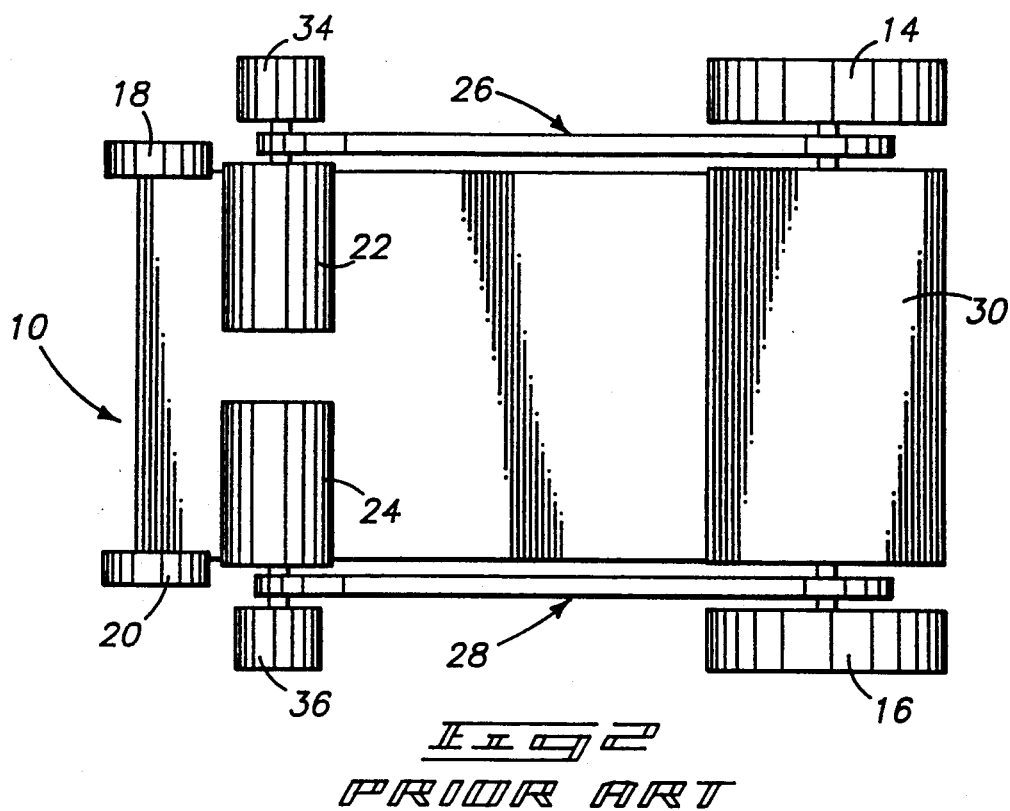
FIG. 2 is a diagram illustrating the power transmission of the powered wheelchair shown in FIG. 1.

As shown in the coupler configuration of FIG. 4, the first drives 71 and 81 are positioned inboard of the second drives 72 and 82. As a result, the electric brakes 59 and 61 are aligned with the second drives 72 and 82 which couple to the drive wheels 54 and 56. This positioning is advantageous in that the electric brakes 59 and 61 are positioned farther inboard than previously positioned in prior art configurations. For example, in the prior art powered wheelchair 10 of FIG. 2, the brakes 34 and 36 are outside of the drives 26 and 28 which couple to the drive wheels 14 and 16.

In another embodiment, the motors 62, 64, 66, and 68 may be of the type which have a shaft extending entirely through the motor casing and out both ends. As shown in FIG. 5, motor 300 has a shaft 301 extending entirely therethrough. Similarly, a motor 302 has a shaft 303 extending entirely therethrough. A drive 304 is coupled between the motors 300 and 302 to the inside of the wheelchair. This is possible due to the use of through-shaft motors 300 and 302. A drive 306 is coupled to an outboard portion of the shaft 303 of the motor 302 and a wheel axle 308 of the drive wheel 56. A brake 310 is mounted to engage the shaft 301 of the motor 300. The use of through-shaft motors 300 and 302 allows the drive 304 to be positioned inboard and the brake 310 to be positioned adjacent the motor 300. As a result, the transmission system may be positioned between the drive wheels 54 and 56, and not protrude unnecessarily from of the powered wheelchair.

The motor 302 includes a clutch 312 which disengages the low speed motor 300 to enhance drive efficiency in high speed ranges. By employing the clutch 312, the low speed motor 300 need not be "free wheeling", but may be, for example, a small gearmotor.

FIG. 6 shows the coupler 80 employed in the powered wheelchair 50. The coupler 80 comprises a first drive 81 coupled between the motors 66 and 68 and a second drive 82 coupled between the motor 66 and the drive wheel 56. The first drive 81 preferably comprises a belt 83 coupled between a pulley 84 connected to the shaft of the motor 68 and a pulley 85 connected to the shaft of the motor 66. The second drive 82 preferably comprises a belt 86 coupled between a pulley 87 connected to the shaft of the motor 66 and a pulley 88 coupled to drive the drive wheel 56.

The pulley 85 has a diameter larger than a diameter of the pulley 84. Additionally, the pulley 88 has a diameter larger than a diameter of the pulley 87 and the pulley 85 has a diameter larger than the diameter of pulley 87. The coupler arrangement shown in FIG. 6 permits the use of larger pulleys 84 and 87, which decreases potential belt slippage caused by rain and snow, than if the same drive reduction was attempted by use of a single belt.

A drive tensioner 90 is attached to the motor 68 to provide tension on the first and second drives 81 and 82. Preferably, only one drive tensioner is used. However, if the drive tensioner 90 does not provide sufficient tension on the second drive 82, thereby resulting in undesired belt slippage, the present invention contemplates alternative approaches. For example, a second drive tensioner 92 may be connected to the motor 66 to supply additional tension on the second drive 82. Another approach is to connect a spring device 94 between the two motors 66 and 68 so that the spring device 94 transfers the tension provided to the motor 68 by the drive tensioner 90 to the motor 66. Yet another approach to improve tension on the second drive 82 would be to employ a chain or synchronous belt, in place of the traditional belt 86, and two sprockets, in place of the pulleys 87 and 88. Employing a chain or synchronous belt and sprockets eliminates the problem concerning belt slippage due to lack of sufficient tension. The use of gears is also another possibility.

The configuration of the coupler 70 is identical to that described above with respect to the coupler 80, and is omitted.

FIGS. 6 and 7 show two other embodiments of coupler configurations for the power transmission according to the present invention. In both figures, only one coupler is shown with respect to the motors 66 and 68 and the drive wheel 56. However, an identical coupler configuration would also be employed for the motors 62 and 63 and the drive wheel 54.

As shown in FIG. 7, a coupler 100 comprises a first drive 102 coupled between the motor 66 and the drive wheel 56 and a second drive 110 coupled between the motor 68 and the drive wheel 56. The drive 102 comprises a belt 104 coupled between a pulley 106 connected to a shaft of the motor 66 and a pulley 108 connected to drive the drive wheel 56. The second drive 110 comprises a belt 112 coupled between a pulley 114 connected to a shaft of the motor 68 and a pulley 116 coupled to drive the drive wheel 56. The pulleys 108 and 116 are preferably the same size and thus are shown superimposed on each other. The pulley 108 has a diameter which is larger than that of the pulley 106, which in turn is larger than the diameter of the pulley 114.

A drive tensioner 120 is connected to the motor 66 to provide tension to the first drive 102. A drive tensioner 122 is connected to the motor 68 to provide tension on the second drive 110.

As shown in FIG. 8, a coupler 130 comprises a single drive 132 coupling the motors 66 and 68 to the drive wheel 56. The drive 132 comprises a belt 134 coupled to the pulleys 136, 138, and 140. The pulley 136 is connected to the shaft of the motor 66; the pulley 138 is connected to the shaft of the motor 68; and the pulley 140 is connected to drive the drive wheel 56. The pulley 140 has a diameter larger than the diameter of the pulley 136, which is larger than the diameter larger of the pulley 138.

A drive tensioner 142 is connected to the motor 66 to provide tension to the drive 132. A second drive tensioner 144 is connected to the motor 68 to provide tension to the drive 132.

Although the couplers 80, 100, and 130 have been described in the preferred embodiments as employing belts and pulleys, the present invention contemplates other drive mechanisms such as a gear mechanism, synchronous belts (timing, HTD, or the like) and sprockets, a sprocket and chain mechanism, a cog on tire mechanism, or any combination thereof.

In FIG. 9, a coupler comprises a gear drive 320 coupled between the through-shaft motors 300 and 302 and a belt and pulley drive 322 coupled between the motor 302 and the drive wheel 56. Although through-shaft motors are shown, a combination gear drive/belt and pulley drive system may be employed on the motors shown in FIG. 4. Further, a chain and sprockets may be used instead of a belt and pulleys.

Employing multiple motors for each driven wheel as shown, for example, in FIGS. 3 and 4 has several advantages. First, the motors 62, 64, 66 and 68 provide two distinct speed and torque ranges to the powered wheelchair 50. That is, the motors 62 and 66 drive the powered wheelchair 50 at a high speed at modest torque levels for fast operation outside on level terrain. The motors 64 and 68 drive the powered wheelchair 50 at a low speed at high torque levels for operation on hills, indoors, or whenever high speed is not desired. Operation in low speed consumes less battery energy.

Second, the low speed motors 64 and 68 may be used to provide dynamic braking to slow the powered wheelchair 50. For example, when the wheelchair is traveling downhill, the wheelchair operator may select the low speed range and thereby slow the chair via dynamic braking, rather than applying reverse power to the motors. Another advantage is that the motors 64 and 68 may be used to provide regenerative braking to slow the wheelchair and simultaneously recharge the battery 53. Yet another advantage is that a motor which is not being used to drive the wheelchair may operate as a tachometer to generate a back EMF proportional to the motor speed. For example, if the powered wheelchair 50 is in the high speed range and thereby employing motors 62 and 66, the motors 64 and 68 may be operated as tachometers.

FIGS. 10–12 are schematics of three different power transmission control systems which may be employed to control the operation of the powered wheelchair of the present invention. Each control system is electrically coupled to control the speed and direction of the powered wheelchair 50 by selectively activating certain ones of the motors 62, 64, 66, and 68.

FIG. 10 illustrates an open loop control circuit 150 having a high/low speed relay circuit 152 and a dual pulse width modulator (PWM) motor controller 154. The relay circuit 152 is coupled to each of the motors 62, 64, 66, and 68 by conductors 156. The relay circuit 152 comprises one double-pole double-throw relay for selecting the correct motors to drive. Alternatively, the relay circuit 152 may comprise a simple double-pole double-throw switch. A manual switch 158, having a low speed position and a high speed position, controls the relay circuit 152. When the switch 158 is in the high speed position, the relay circuit 152 turns "on" the motors 62 and 66 to drive the powered wheelchair 50 at a high speed. On the other hand, when the switch 158 is in the low speed position, the relay circuit 152 turns "on" the motors 64 and 68 to drive the powered wheelchair 50 at a low speed.

The motor controller 154 is coupled to the relay circuit 152 via conductors 160. The motor controller 154 controls the speed and direction of the motors 62, 64, 66, and 68 depending upon which motors are presently turned "on" by the relay circuit 152. The motor controller 154 is also coupled to the electric brakes 59 and 61 via a conductor 162.

A manual control mechanism 164 provides input commands indicative of direction and speed to the motor controller 154 and will be described below in more detail. The manual control mechanism 164 and the manual switch 158 are attached to the frame 52 of the powered wheelchair 50 in a location which facilitates easy use by the wheelchair operator. For example, the manual control mechanism 104 may comprise a joystick mechanism 32 which is attached to the frame 52 within arms reach of the wheelchair operator as shown in FIG. 3.

FIG. 11 illustrates a closed loop control circuit 170 according to the present invention which comprises a high/low speed relay circuit 172, a tachometer circuit 174, and a dual PWM motor controller 155. The high/low speed relay circuit 172 is coupled to each of the motors 62, 64, 66, and 68 via conductors 176. The relay circuit 172 could be comprised of two double-pole double-throw relays for selecting which of the motors 62, 64, 66, and 68 are to be driven and operates in a manner similar to that described for the relay circuit 152 in FIG. 10.

The tachometer circuit 174 is coupled to the motors 62, 64, 66, and 68 via the conductors 176 and 178. The tachometer circuit 174 measures the motor speed of the motors 62, 64, 66, and 68. When one of the motors 62, 64, 66, and 68 is not being used to drive the powered wheelchair 50, that motor generates a back EMF proportional to motor speed on a corresponding conductor 176 and 178 which may then be measured by the tachometer circuit 174.

The tachometer circuit 174 outputs signals indicative of motor speed over conductors 180 to the motor controller 155. The motor controller 155 outputs signals indicative of speed and direction over the conductors 182 to the relay circuit 172. The motor controller 155 controls the speed and direction of the motors 62, 64, 66, and 68 depending upon which motors are presently turned "on" by the relay circuit 172. The motor controller 155 employs the motor speed feedback information from the tachometer circuit 174 to ensure that the powered wheelchair 50 tends to maintain the desired speed and direction, even on hills or uneven terrain. The motor controller 154 also outputs signals over conductor 163 to control the electric brakes 59 and 61.

A manual switch 159 is coupled to the relay circuit 172 and the tachometer circuit 174. The manual switch 159 permits the wheelchair operator to switch between a high speed mode and a low speed mode. In addition, a manual control mechanism 165 is provided to input command signals to the motor controller 155.

FIG. 12 is a schematic of a microprocessor based power wheelchair control system 190 which comprises a transmission controlling microprocessor 192, motor controllers 194, 196, 198, and 200, and tachometer circuits 202, 204, 206 and 208. The microprocessor 192 outputs high speed signals to the motor controllers 194 and 198 over conductors 210, and outputs low speed signals to the motors controllers 196 and 200 over conductors 212. The motor controllers 194, 196, 198, and 200 control the rotational speed and direction of the motors 62, 64, 66, and 68, respectively.

The tachometer circuits 202, 204, 206, and 208 are coupled to measure the motor speed of the respective motors 62, 64, 66, and 68. The tachometer circuits 202, 204, 206, and 208 feed back the motor speed information via conductors 214 to the microprocessor 192. The microprocessor 192 is also coupled to the electric brakes 59 and 61 via conductors 216.

The microprocessor 192 is powered by the battery 53. The microprocessor 192 senses both the current and voltage from the battery 53. A charger 220 is used, normally at night, to maintain a charge on the battery 53.

A manual control mechanism 167 supplies signals indicative of speed and direction to the microprocessor 192. The control mechanism 167 is attached to the wheelchair in a location which permits easy use by the wheelchair operator.

The microprocessor based control system 190 of FIG. 12 has several advantages over the open and closed loop control systems of FIGS. 10 and 11. The microprocessor system control 190 can control the shifting between high and low speed ranges, without the need of a manual switch and relay circuit. Automatic shifting would be determined by the microprocessor depending upon the battery voltage, motor currents, and movement patterns of the control mechanism 167. If the wheelchair operator desires to go forward at high speed, he/she would operate the control mechanism 167 in an appropriate manner to instruct the microprocessor 192 to output forward, high speed signals to the motor controllers 194 and 198. If the wheelchair operator desired to go in a reverse direction at low speed, he/she would operate the control mechanism 167 in an appropriate manner to instruct the microprocessor 192 to output reverse, low speed signals to the motor controllers 196 and 200. A manual selection switch still might be useful, however, for high and/or low speed lockout.

Another advantage to using a microprocessor is that the microprocessor 192 can time multiplex the speed signals output to the motor controllers 194, 196, 198, and 200 to provide a continuously variable transmission. That is, the time multiplexing would permit the motors 62, 64, 66 and 68 to achieve "in between" gear ratios. The use of this effect may be somewhat limited, but has been demonstrated to occur between approximately 10 and 30 Hz.

The manual control mechanism 167 (and the mechanisms 164 and 165) is a continuously analog transducer which generates signals proportional to speed and direction. Preferably, the control mechanism 167 includes a two axis inductive or potentiometric joystick 169. However, a sip and puff mechanism, various switches, head position sensing systems, voice recognition, EMG, EEG, or other controlling means may be employed in place of the joystick 169.

Figure 13:
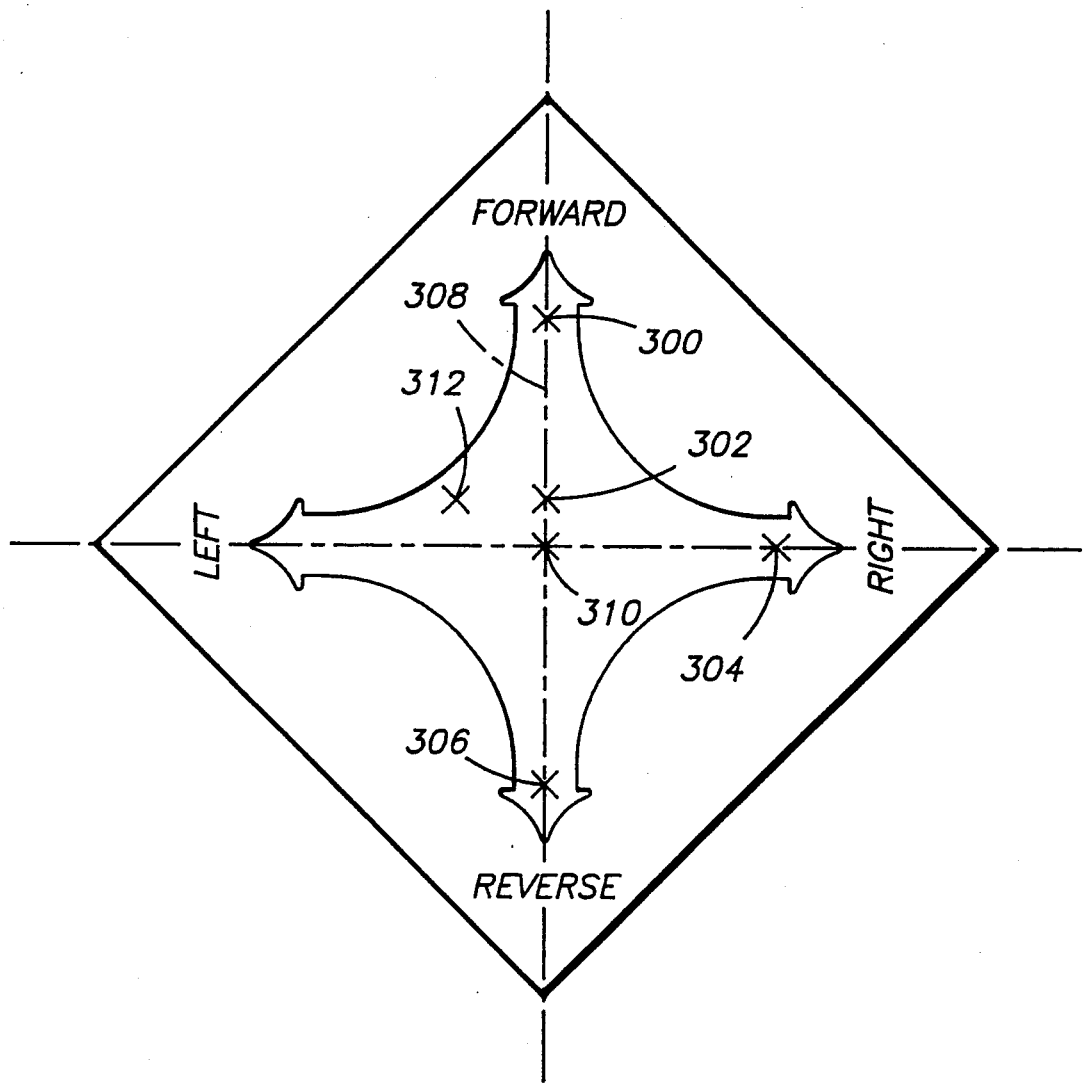
FIG. 13 diagrammatically illustrates a manual control mechanism employed to control the speed and direction of the powered wheelchair of FIG. 3.

The joystick 169 has a variable range of movement which corresponds to speed and direction. FIG. 13 diagrammatically shows the operation of the joystick 169. If the joystick 169 is positioned in the full forward position 300 and other conditions are met, such as motor current being in a certain range, the microprocessor 192 outputs high speed signals such that the motors 62 and 66 drive the powered wheelchair at a high speed in the forward direction. At position 302, the microprocessor 192 might output low speed signals such that the motors 64 and 68 drive the powered wheelchair 50 at a low speed in a forward direction. At position 304, the microprocessor 192 would instruct the right side motors 62 and 64 to rotate in a reverse direction and the left side motors 66 and 68 to rotate in a forward direction to effectuate a right hand turn. At position 306, the microprocessor 192 would instruct the low speed motors 64 and 68 to drive the powered wheelchair 50 in a reverse direction at a low speed. An infinite number of relationships between joystick positioning and speed/direction control are possible. One of the reasons that the present invention employs a microprocessor is to provide programmable control for any desired relationship.

As is evident from the illustration in FIG. 13, the speed of the wheelchair is dependent upon the position of the joystick 169 along the forward-reverse axis 308. As the joystick 169 is moved along the axis 308, the microprocessor 192 outputs signals to the motor controllers 194, 196, 198, and 200 to vary the rotational speed and direction of the motors 62, 64, 66, and 68. As mentioned above, the signals could be time multiplexed to effectuate a continuously variable transmission. Alternatively, the microprocessor 192 could switch between the low speed motors 64 and 68 and the high speed motors 62 and 66 depending upon predetermined positions of the joystick 169. For example, the joystick 169 may be moved through predefined regions along the forward-reverse axis 308 ranging from full forward (near position 300), through neutral (near position 310), to full reverse (near position 306).

According to one preferred embodiment, the microprocessor shifts between high speed and low speed depending upon a combination of inputs received from the control mechanism 167 and the motor currents (battery current from battery 53). Preferably, the microprocessor 192 shifts to high speed when the joystick 169 is in a region of approximately three-fourths full forward to full forward, and the battery current is less than 40 amps. On the other hand, the microprocessor 192 will shift to a low speed range when the joystick 169 is in neutral, or is in a region of approximately one-third full reverse to full reverse, or the battery current is greater than 80 amps.

Although the joystick movement is described for explanation purposes in relation to the forward-reverse axis 308, the joystick 169 is not limited to this linear motion. Rather, the joystick 169 has full circular motion range and may, for example, be positioned at position 312 which effectuates a forward and leftward curving movement of the powered wheelchair 50.

Although the above embodiment shown in FIG. 12 is described as using a microprocessor 192, other circuits, such as custom integrated circuits or any other logic means, may be designed to monitor and control the devices of the powered wheelchair 50.

The power wheelchair 50 has been described as having two motors for each drive wheel. The present invention is not limited to two motors per drive wheel, but contemplates the use of multiple motors for each drive wheel. For example, if a higher third speed range (such as 10-20 miles per hour) is desired, a third motor may be added to drive each drive wheel. In this manner, the three motors per drive wheel would enable the wheelchair to have a low speed range, an intermediate speed range, and a high speed range.

The power transmission of the present invention may also be employed to drive only a single drive wheel. The coupler arrangements shown in FIGS. 5-7 may be used to drive the single drive wheel, for example, on three wheel scooters and carts. On the other hand, more than two drive wheels may be employed. For example, a powered wheelchair according to the present invention may be designed with four drive wheels.

Although the preferred embodiment has been described with respect to powered wheelchairs, other powered vehicles may incorporate the power transmission system described above. For example, the power transmission of the present invention may be employed in other electric powered motor vehicles, motorized golf carts, and electric bicycles.

The powered wheelchair according to the present invention has numerous advantages over prior art powered wheelchairs having a single motor per drive wheel. First, the powered wheelchair of the present invention has a low speed range and a high speed range. The wheelchair operator can select the low speed range when climbing hills or maneuvering over obstacles. The low speed range prevents excessive motor heating and power consumption and provides adequate power to turn or better perform maneuvers on an incline. When traveling downhill, the wheelchair operator can select the low speed range for increased dynamic or regenerative braking, rather than applying reverse power to the motors, to properly slow the chair.

On the other hand, when traveling on relatively flat terrain, the wheelchair operator can select the high speed range. The wheelchair of the present invention can reach speeds of 8-12 miles per hour.

Another advantage of the present invention is that the multiple motor per drive wheel arrangement is beneficial in the event that one of the motors fails because the remaining motors can still drive the wheelchair.

The powered wheelchair according to the present invention also has several advantages over a powered wheelchair having one motor and a two or more speed transmission for each drive wheel. First, the power transmission of the present invention is mechanically simple. Second, employing multiple motors per drive wheel enables at least one of the motors to provide regenerative or dynamic braking, or to operate as a tachometer.

In compliance with the statute, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A powered vehicle comprising:
   a frame;
   first and second independently rotatable drive wheels mounted to the frame;
   first and second motors attached to the frame;
   a first coupler connecting the first and second motors to the first drive wheel such that the first motor drives the first drive wheel in a first speed range and the second motor drives the first drive wheel in a second speed range, wherein the first coupler comprises:
   a first drive coupled between the first motor and the second motor; and
   a second drive coupled between the first motor and the first drive wheel;
   a first drive tensioner coupled to the second motor;
   a first spring device coupled between the first and second motors to transfer tension provided by the first drive tensioner to the second drive;
   third and fourth motors attached to the frame;
   a second coupler connecting the third and fourth motors to the second drive wheel such that the third motor drives the second drive wheel in the first speed range and the fourth motor drives the second drive wheel in the second speed range, wherein the second coupler comprises:
   a third drive coupled between the third motor and the fourth motor; and
   a fourth drive coupled between the third motor and the second drive wheel;
   a second drive tensioner coupled to the fourth motor; and
   a second spring device coupled between the third and fourth motors to transfer tension provided by the second drive tensioner to the fourth drive.

2. A powered vehicle comprising:
   a frame;
   first and second independently rotatable drive wheels mounted to the frame;
   first and second motors attached to the frame;
   a first coupler connecting the first and second motors to the first drive wheel such that the first motor drives the first drive wheel in a first speed range and the second motor drives the first drive wheel in a second speed range, wherein the first coupler comprises:
   a first flexible drive means coupled between a first coupling wheel connected to the first motor and a second coupling wheel connected to the first drive wheel, the second coupling wheel having a diameter larger than a diameter of the first coupling wheel;

a second flexible drive means coupled between a third coupling wheel connected to the second motor and a fourth coupling wheel connected to the first drive wheel, the fourth coupling wheel having a diameter larger than a diameter of the third coupling wheel, and the diameter of the first coupling wheel being larger than the diameter of the third coupling wheel;

third and fourth motors attached to the frame;

a second coupler connecting the third and fourth motors to the second drive wheel such that the third motor drives the second drive wheel in the first speed range and the fourth motor drives the second drive wheel in the second speed range, wherein the second coupler comprises:

a third flexible drive means coupled between a fifth coupling wheel connected to the third motor and a sixth coupling wheel connected to the second drive wheel, the sixth coupling wheel having a diameter larger than a diameter of the fifth coupling wheel; and a fourth flexible drive means coupled between a seventh coupling wheel connected to the fourth motor and an eighth coupling wheel connected to the second drive wheel, the eighth coupling wheel having a diameter larger than a diameter of the seventh coupling wheel, and the diameter of the fifth coupling wheel being larger than the diameter of the seventh coupling wheel.

3. A powered vehicle comprising:

a frame;

first and second independently rotatable drive wheels mounted to the frame;

first and second motors attached to the frame;

a first coupler connecting the first and second motors to the first drive wheel such that the first motor drives the first drive wheel in a first speed range and the second motor drives the first drive wheel in a second speed range;

third and fourth motors attached to the frame:

a second coupler connecting the third and fourth motors to the second drive wheel such that the third motor drives the second drive wheel in the first speed range and the fourth motor drives the second drive wheel in the second speed range; and a control system electrically coupled to activate selectively the first, second, third, and fourth motors to achieve a desired speed of the vehicle, the control system having a high/low speed relay circuit coupled to switch selectively the motors between the high speed range and the low speed range, and a motor controller coupled to provide signals indicative of direction and speed to the high/low speed relay circuit.

4. A powered vehicle according to claim 3 wherein the high/low speed relay circuit has outputs coupled to supply speed control signals to the motors;

the control system further comprising:

a tachometer circuit having inputs coupled to respective ones of the outputs of the high/low speed relay circuit;

a switch operatively connected to control the high/low speed relay circuit and the tachometer circuit; and the motor controller being coupled to receive signals from the tachometer circuit.

5. A powered vehicle comprising:

a frame;

first and second independently rotatable drive wheels mounted to the frame;

first and second motors attached to the frame;

a first coupler connecting the first and second motors to the first drive wheel such that the first motor drives the first drive wheel in a first speed range and the second motor drives the first drive wheel in a second speed range;

third and fourth motors attached to the frame;

a second coupler connecting the third and fourth motors to the second drive wheel such that the third motor drives the second drive wheel in the first speed range and the fourth motor drives the second drive wheel in the second speed range; and a control system electrically coupled to activate selectively the first, second, third, and fourth motors to achieve a desired speed of the vehicle, the control system comprising:

a control circuit;

a plurality of motor controllers, one being electrically coupled between the control circuit and the motors;

a plurality of tachometer circuits, one being electrically coupled between the control circuit and each of the motors; and the control circuit outputting signals to control the motor controllers and receiving signals from the tachometer circuits.

6. A powered vehicle according to claim 5 wherein the control circuit comprises a microprocessor.

7. A powered vehicle comprising:

a frame;

first and second independently rotatable drive wheels mounted to the frame;

first and second electric motors attached to the frame;

a first coupler connecting the first and second motors to the first drive wheel such that the first motor drives the first drive wheel in a first speed range and the second motor drives the first drive wheel in a second speed range;

third and fourth electric motors attached to the frame;

a second coupler connecting the third and fourth motors to the second drive wheel such that the third motor drives the second drive wheel in the first speed range and the fourth motor drives the second drive wheel in the second speed range;

a control system electrically coupled to activate selectively the first, second, third, and fourth motors to achieve a desired speed of the vehicle;

a battery mounted on the frame to provide power to the motors and to the control system; and the control system having a control circuit and a manual control mechanism for controlling a change of speed between a high speed range and a low speed range, the control circuit being electrically coupled between the manual control mechanism and the first, second, third, and fourth motors, the manual control mechanism including manual activation means for continuously varying among multiple positions which correspond to direction, the high speed range and the low speed range, the manual activation means being positionable from full forward, through neutral, to full reverse, the manual control mechanism providing instruction signals indicative of speed and direction to the control circuit depending upon the selected position, the control circuit also receiving signals indicative of battery current from the battery, the control circuit instructing the motors to shift to the high speed range when;
1. a first predetermined position of the manual activation means is selected; and
2. the battery current is less than a first predetermined amperage;

the control circuit instructing the motors to shift to the low speed range when any one of the following conditions are met:
1. a second predetermined position of the manual activation means is selected;
2. the neutral position of the manual activation means is selected; and
3. the battery current is greater than a second predetermined amperage.

8. A powered vehicle according to claim 7 wherein the first predetermined position is in a range of approximately three-fourths full forward to full forward, and the second predetermined position is in a range of approximately one-third full reverse to full reverse.

9. A powered vehicle comprising:
a frame;
first and second independently rotatable drive wheels mounted to the frame;
first and second motors attached to the frame;
a first coupler connecting the first and second motors to the first drive wheel such that the first motor drives the first drive wheel in a first speed range and the second motor drives the first drive wheel in a second speed range;
a first brake operatively connected to the second motor;
third and fourth motors attached to the frame;
a second coupler connecting the third and fourth motors to the second drive wheel such that the third motor drives the second drive wheel in the first speed range and the fourth motor drives the second drive wheel in the second speed range;
a second brake operatively connected to the fourth motor;
four motor controllers coupled to corresponding ones of the first, second, third, and fourth motors;
four tachometer circuits coupled to corresponding ones of the first, second, third, and fourth motors; and
a microprocessor electrically coupled to the motor controllers, the first and second brakes, and the tachometer circuits, the microprocessor outputting signals to control the motor controllers, the first brake, and the second brake, and the microprocessor receiving signals from the tachometer circuits, the microprocessor selectively instructing the motor controllers to achieve a desire speed of the vehicle.

10. An automatic transmission control system for use in a powered wheelchair having a frame, a battery and multiple motors, the powered wheel chair being capable of traveling in a high speed range and a low speed range, the automatic transmission control system comprising:
circuitry attached to the multiple motors, the circuitry receiving signals indicative of current from a battery;
a manual control mechanism attached to the frame in a location to permit use by a wheelchair operator, the manual control mechanism including manual activation means for continuously varying among multiple positions which correspond to direction, a low speed range and a high speed range, the manual activation means being positionable from full forward, through neutral, to full reverse, the manual control mechanism providing instruction signals indicative of speed and direction to the circuitry depending upon the selected position, the transmission control system placing the powered wheelchair in the high speed range when:
1. a first predetermined position of the manual activation means is selected; and
2. the battery current is less than a first predetermined amperage;

the transmission control system placing the powered wheelchair in the low speed range when any one of the following conditions are met:
1. a second predetermined position of the manual activation means is selected;
2. the neutral position of the manual activation means is selected; and
3. the battery current is greater than a second predetermined amperage.

11. The automatic transmission according to claim 10 wherein the first predetermined position is in a range of approximately three-fourths full forward to full forward, and the second predetermined position is in a range of approximately one-third full reverse to full reverse.

* * * * *